United States Patent
An et al.

(10) Patent No.: US 12,028,933 B1
(45) Date of Patent: Jul. 2, 2024

(54) AUTOMATED SUBSCRIBER IDENTIFICATION MODULE (SIM) ACTIVATION

(71) Applicant: T-Mobile USA, Inc., Bellevue, WA (US)

(72) Inventors: Kyeong Hun An, Sammamish, WA (US); Nilesh Ranjan, Sammamish, WA (US); Tanmay Roy, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 73 days.

(21) Appl. No.: 17/411,798

(22) Filed: Aug. 25, 2021

(51) Int. Cl.
*H04W 8/18* (2009.01)
*H04W 8/20* (2009.01)
*H04W 8/26* (2009.01)

(52) U.S. Cl.
CPC ........... *H04W 8/183* (2013.01); *H04W 8/205* (2013.01); *H04W 8/26* (2013.01)

(58) Field of Classification Search
CPC ....... H04W 8/183; H04W 8/205; H04W 8/26; H04W 8/265
See application file for complete search history.

(56) References Cited

U.S. PATENT DOCUMENTS

| | | | | |
|---|---|---|---|---|
| 10,433,156 | B1* | 10/2019 | Long | H04W 8/205 |
| 2008/0274724 | A1* | 11/2008 | Erskine | H04W 4/24 |
| | | | | 455/419 |
| 2010/0273462 | A1* | 10/2010 | Thorn | H04W 8/26 |
| | | | | 455/414.1 |
| 2011/0092253 | A1* | 4/2011 | Amiel | H04W 8/265 |
| | | | | 455/558 |
| 2012/0252424 | A1* | 10/2012 | Cormier | H04W 12/06 |
| | | | | 455/418 |
| 2013/0012185 | A1* | 1/2013 | Lavi | H04M 1/72406 |
| | | | | 455/418 |
| 2015/0282060 | A1* | 10/2015 | Huang-Fu | H04W 8/205 |
| | | | | 455/435.2 |
| 2015/0365883 | A1* | 12/2015 | MacPherson | H04W 12/084 |
| | | | | 370/328 |
| 2016/0183083 | A1* | 6/2016 | Lewis | H04L 65/1016 |
| | | | | 370/328 |
| 2017/0135059 | A1* | 5/2017 | Taneja | H04W 12/35 |
| 2018/0124593 | A1* | 5/2018 | Ricciato | H04W 12/50 |
| 2019/0190775 | A1* | 6/2019 | Buckley | H04L 67/56 |

* cited by examiner

*Primary Examiner* — Barry W Taylor
(74) *Attorney, Agent, or Firm* — Lee & Hayes, P.C.

(57) ABSTRACT

Described herein are techniques, devices, and systems for receiving, by a mobile device and from a subscriber identity module (SIM), an input associated with an unstructured supplementary service data (USSD) code. The input can be provided by the SIM based on application data stored in the SIM. The SIM can receive the application data via an over-the-air (OTA) platform. The mobile device can transmit, to a service provider core network, a request associated with the USSD code. The mobile device can receive a subscription value based on the USSD code. The subscription value can be a mobile station international subscriber directory number (MSISDN) or an internet protocol (IP) multimedia subsystem (IMS) public user identity (IMPU).

20 Claims, 4 Drawing Sheets

AUTOMATED SUBSCRIBER IDENTIFICATION MODULE (SIM) ACTIVATION

BACKGROUND

A subscriber identity module (SIM) can store information that identifies a particular subscriber to telecommunication network services. For example, a SIM can store a mobile station international subscriber directory number (MSISDN) and an internet protocol (IP) multimedia subsystem (IMS) public user identity (IMPU). The MSISDN is unique number, sometimes colloquially referred as a telephone number, that identifies a wireless network subscription for a user of a mobile device and that can be used to place a call to the mobile device. The MSISDN must be registered with a mobile network operator (MNO) (also referred to herein as a "service provider") before the mobile device can receive the call. At least one IMPU that is associated with the wireless network subscription can be stored in the SIM and utilized by other users to request communications via the mobile device. The IMPU, sometimes also referred to as an address of record (AoR), is a number that must be registered with the service provider before the mobile device can be utilized for IMS procedures.

The service provider can utilize a telecommunication network that supports an over-the-air (OTA) protocol and a remote file management (RFM) protocol, the OTA protocol being a wireless technology for exchanging communications with mobile devices, the RFM protocol being utilized for transmitting (e.g., "pushing") data (e.g., one or more files) to the mobile devices. The mobile devices and the telecommunication network can be compatible with one or more generations of wireless access technologies, including fifth generation (5G) wireless access technologies, and fourth generation (4G) wireless access technologies such as long term evolution (LTE) technology. The service provider can utilize OTA to transmit MSISDNs and IMPUs to the mobile devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Cellular communication devices (also referred to herein as "mobile devices" or "user equipment (UEs)") such as smartphones can utilize SIMs (e.g., a SIM card, an embedded SIM (eSIM), an integrated SIM (iSIM), etc.) to store wireless subscriber information associated with users of the mobile devices. The wireless subscriber information can be utilized by a service provider network (e.g., a fifth generation (5G) mobile network) to provide wireless services for the users (also referred to herein as "subscribers" or "customers"). The mobile devices can receive the wireless subscriber information, such as a mobile station international subscriber directory number (MSISDN) and an internet protocol (IP) multimedia subsystem (IMS) public user identity (IMPU), from the service provider network (also referred to herein as a "telecommunication network," a "wireless network," or a "network") associated with a mobile network operator (MNO) (also referred to herein as a "provider" or a "service provider").

A mobile device can perform a network registration process to receive the wireless subscriber information determined by an MNO. The mobile device can initiate the network registration process based on the mobile device establishing a connection with a telecommunication network associated with the MNO. The network registration process can include the mobile device transmitting one or more request(s) (e.g., request message(s)) for the wireless subscriber information (e.g., MSISDN and the IMPU), and receiving one or more corresponding responses (e.g., response message(s)) including the wireless subscriber information (e.g., MSISDN and the IMPU). The request(s) for the wireless subscriber information can be processed by the wireless network, based on the request(s) being received by the wireless network within an activation period. The activation period can be a period of time from when a user of the mobile device activates a mobile subscription with the MNO. The SIM can store, as part of the network registration process, the MSISDN and the IMPU that are received by the mobile device.

The mobile devices often can be configured and sold by different wireless network operators, each of which maintains a respective service provider network. The different networks are interconnected so that the subscribers of different providers can communicate with each other. However, some types of mobile devices, and/or mobile devices that communicate via some types of wireless networks, are unable to perform at least some operations based on MSISDNs and/or IMPUs not being stored in the SIMs associated with the mobile devices. In some cases, the MSISDNs and/or the IMPUs not being stored in the SIMs may result from the mobile devices not establishing a connection to the wireless networks within the activation period. In some cases, an aggregate length of time associated with at least one period of time during which the mobile devices are connected to the wireless networks within the activation period may result in the SIMs not storing the MSISDNs and/or the IMPUs. In those cases, the MNO may refrain from transmitting the MSISDNs and/or the IMPUs to the mobile devices based on the aggregate length of time being less than a threshold length of time. In those cases, the mobile devices do not receive the MSISDNs and/or the IMPUs to be stored in the SIMs.

Described herein are techniques for automated activation of a SIM using an onboard application to obtain wireless subscriber information. Application data (also referred to herein as "application") utilized to execute and/or utilize the application can be received from the wireless network and stored in the SIM. The application can be utilized by the SIM to transmit one or more requests (e.g., one or more requests (e.g., SIM information request(s)) associated with a configurable value (e.g., an unstructured supplementary service data (USSD) code)) to a mobile device associated with the SIM. Based on receiving the SIM information request(s), the mobile device can transmit one or more corresponding request(s) (e.g., a wireless subscriber information request(s)) to a wireless network, for the wireless subscriber information. The wireless subscriber information request(s) can be transmitted by the mobile device, based on the mobile device being connected to the wireless network at any time (e.g., within, or after, an activation period).

The techniques, devices, and systems described herein provide reliable and robust activation of SIMs, which ensures proper operation of mobile devices. The mobile devices are controlled to exchange communications required for the SIMs to be activated, notwithstanding unpredictable and/or prolonged delays in establishing connections between the mobile devices and the wireless networks. The mobile devices, including any types of mobile devices associated with any types of wireless networks, are able to successfully perform any operations that rely on the MSISDNs and the IMPUs being stored in the SIMs. By not relying on activation periods as in traditional approaches to how mobile devices obtain the MSISDNs and the IMPUs, the techniques, devices, and systems described herein allow for increased flexibility and dependability in activation processes for the SIMs.

Furthermore, the techniques, devices, and system described herein allow the SIMs are to be activated without disruptions that occur in traditional activation approaches, which may be crucial in emergency or crisis situations. The SIMs are able to receive the wireless subscriber information based on the mobile devices connecting to the wireless networks regardless of any delay, such as delays caused by extreme environmental conditions and/or other hazardous circumstances. The SIMs receive the wireless subscriber information in a timely manner, notwithstanding connections between the mobile devices and the wireless networks being established outside of activation periods associated with subscriber accounts of users of the mobile devices.

Moreover, the techniques, devices, and systems described herein ensure that computational resources of the MNO (e.g., the wireless network associated with the MNO) required for activation of SIMs is minimized. The SIMs can be operated based on instructions associated with the applications stored thereon to cause the mobile devices to transmit request(s) (e.g., wireless subscriber information request(s)) for the wireless subscriber information (e.g., the MSISDNs and the IMPUs). The wireless subscriber information request(s) being transmitted by the mobile devices based on the instructions associated with the applications stored in the SIMs reduce numbers of subsequent requests that would otherwise be processed by the wireless network according to traditional approaches. Instead of requiring the users of the mobile devices to submit, after failure of an initial registration process, one or more other subsequent activation requests to the MNO, the applications stored in the SIMs can cause the mobile devices to transmit wireless subscriber information request(s) to the wireless network. The mobile devices can transmit the wireless subscriber information request(s) to receive the MSISDNs and the IMPUs after an initial registration process fails (e.g., after expiration of the activation periods) the same was as for wireless subscriber information request(s) transmitted by the mobile devices during the activation periods. The MNO (e.g., the wireless network associated with the MNO) can allocate computation resources that are conserved by eliminating processing of the subsequent activation request(s) to other purposes.

Figure 1:
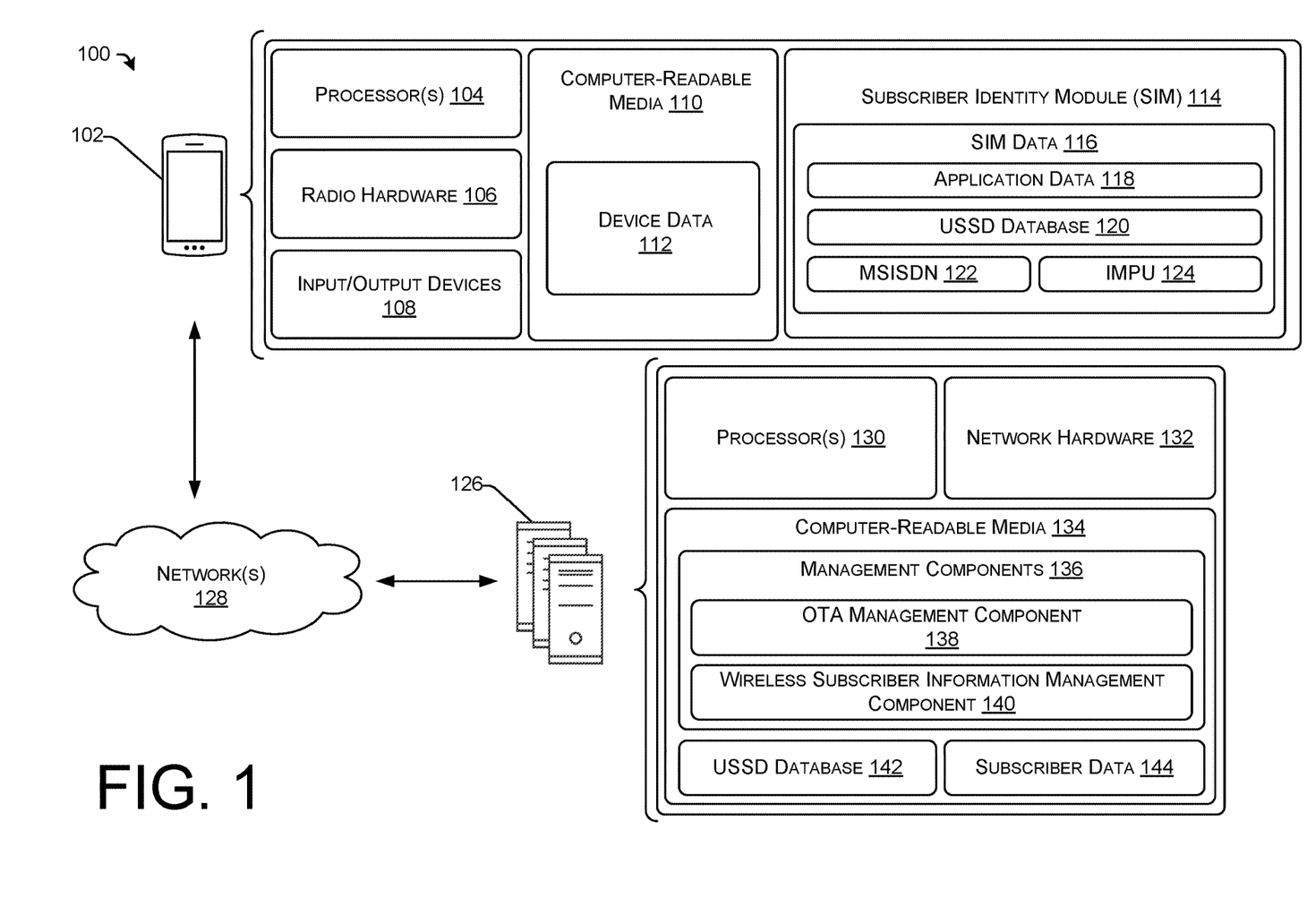
FIG. 1 schematically illustrates a system for automated activation of a subscriber identification module (SIM) using an onboard application, in accordance with some examples of the present disclosure.

Illustrative Systems for Automated Activation of a SIM Using an Onboard Application to Obtain Wireless Subscriber Information FIG. 1 schematically illustrates a system 100 for automated activation of a subscriber identification module (SIM) using an onboard application, in accordance with some examples of the present disclosure. The system 100 can include a user equipment (UE) 102. In some examples, the user equipment 102 can be configured with processor(s) 104, radio hardware 106, input/output devices 108, and computer-readable media 110.

In some examples, the user equipment 102 can be any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart ewatch, fitness trackers, etc.), an IoT device, an in-vehicle (e.g., in-car) computer, a television (smart television), set-top-box (STB), desktop computer, an autonomous vehicle, a medical device, and/or the like.

The processor(s) 104 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In some examples, an accelerator can represent a hybrid device, such as one from ZYLEX or ALTERA that includes a CPU course embedded in an FPGA fabric. In various embodiments, the processor(s) 104 can execute one or more components and/or processes to cause the user equipment 102 to perform a variety of functionalities, as set forth above and explained in further detail in the following disclosure. Additionally, each of the processor(s) 104 can possess its own local memory, which also can store program components, program data, and/or one or more operating systems.

The radio hardware 106 provides the user equipment 102 with wireless capabilities, such as connecting to one or more base stations associated with one or more service providers. The radio hardware 106 can include or be incorporated into processors, ASICs, programmable circuits such as FPGAs, or in other ways. In some examples, the radio hardware 106 can include radios associated with one or more radio access technologies (e.g., second generation (2G), third generation (3G), fourth generation (4G), fifth generation (5G), etc.). The user equipment 102 can include additional or alternative hardware to enable the device to access service provider(s) via additional or alternative network(s) (e.g., BLUETOOTH®, WI-FI®, etc.).

The radio hardware 106 can configure the user equipment 102 for transmitting and/or receiving data wirelessly using any suitable wireless communications and/or data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Service provider (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over internet protocol (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future internet protocol (IP)-based service provider technology or evolution of an existing IP-based service provider technology. In some examples, the user equipment 102 can be associated with radio hardware 106 available by either or any service providers with which the user equipment 102 is configured to be operable with.

The user equipment 102 can include input/output device(s) 108. In some examples, the input/output device(s) 108 can include a display, which can output information in a pictorial (or, in some examples, tactile) form. The display can be an electroluminescent display, liquid crystal display, a light-emitting diode display, plasma display, quantum dot display, etc. In some examples, the display can be a touch display, whereby touch of the display is an input method. In some examples, the input/output device(s) 108 can include a speaker, a microphone, a stylus, a mouse, a keyboard, or the like. For the purpose of this discussion, a user can interact with the user equipment 102 via the input/output device(s) 108. That is, a user can provide touch input, speech input, etc. to interact with the user equipment 102. Similarly, the user equipment 102 can output information to the user via presentation on a display, audible output, etc.

Depending on the exact configuration and type of the user equipment 102, the computer-readable media 110, can include computer storage media and/or communication media. The computer storage media can include volatile memory, nonvolatile memory, and/or other persistent and/or auxiliary computer storage media, removable and non-removable computer storage media implemented in any method or technology for storage of data such as computer readable instructions, data structures, program components, or other data. Computer memory is an example of computer storage media. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, service provider attached storage, storage area service providers, hosted computer storage or any other storage memory, storage device, and/or storage medium that can be used to store and maintain data for access by a computing device.

In some examples, the computer storage media can include non-transitory computer-readable media. Non-transitory computer-readable media can include volatile and nonvolatile, removable and non-removable tangible, physical media implemented in technology for storage of data, such as computer readable instructions, data structures, program components, or other data. The computer-readable media 110 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired data and which can be accessed by the user equipment 102. Any such non-transitory computer-readable media can be part of the user equipment 102.

In contrast, communication media includes computer readable instructions, data structures, program components, or other data in a modulated data signal, such as a carrier wave, or other transmission mechanism. As defined herein, computer storage media does not include communication media.

In some examples, device data 112 can be stored on the user equipment 102, for example in the computer-readable media 110 (e.g., a database in the computer-readable media 110). However, this disclosure is not limited as such and one or more portions of the device data 112 can be stored in, alternatively or additionally to the computer-readable media 110, any of one or more other databases or one or more other data stores on the user equipment 102. The device data 112 can include, but is not limited to, identification data (e.g., an international mobile subscriber identity (IMSI), etc.) associated with the user equipment 102, an internet protocol (IP) address (e.g., an IP address utilized by the user equipment 102 to connect to the network(s) 128, as discussed below), a service provider login (e.g., an identifier including an account name and an active directory associated with an account provided by a service provider), user account data (e.g., account name, account number, etc.), service provider data (e.g., current service provider, available service providers, service(s) available via the service provider, etc.), brand data (e.g., current brand associated with the user equipment 102, etc.), context data (e.g., which application(s) are executing on the user equipment 102), capability data (e.g., which radio access technology(s) the user equipment 102 is configured to use, etc.), authentication data, and/or the like. In some examples, the device data 112 can indicate device features, including, but not limited to, radio technology (e.g., NR, LTE, UMTS, CDMA, GSM), a frequency band, voice protocol (e.g., voice on UMTS, CDMA, GSM, etc.), messaging (e.g., short message service (SMS) messaging), a speed feature (e.g., carrier aggregation (CA), 4×4 multiple input and multiple output (MIMO), or 256QAM modulation in downlink, etc.), regulatory data (e.g., E911 location, wireless emergency alerts (WEA), etc.), dual SIM lock data, dual device unlock data, IP multimedia subsystem (IMS) services (e.g., voice over LTE (VoLTE), wi-fi calling (WFC), rich communication services (RCS), etc.), mobile hotspot data, accessibility data (e.g., text telephone (TTY), real time text (RTT), etc.), a service provider service (e.g., visual voicemail, account management, name/identification, etc.), a third-party application, a setting (e.g., access point name (APN), browser default, ringtone, splash screen, etc.), a background (e.g., identification applications, analytics applications, etc.), etc.

In some examples, the user equipment 102 can be associated with a SIM 114. In some examples, the SIM 114 can configure the user equipment 102 to operate via a service provider. That is, the SIM 114 can configure the user equipment 102 such that the user equipment 102 can communicate with other user devices via base stations and/or network devices associated with the service provider. Base stations (also known as cell sites or cell towers) can be associated with antennae and other electronic communications equipment (e.g., transceivers, digital signal processors, control electronics, a GPS receiver, etc.) to create a cell. A service provider can have multiple base stations, creating multiple cells, thereby generating a cellular network. In some examples, the SIM 114 can enable the user equipment 102 to access services provided via a core network associated with the service provider. In some examples, such services can include IMS-based services, including but not limited to, telephony services, emergency services (e.g., E911), gaming services, instant messaging services, presence services, video conferencing services, social networking and sharing services, location-based services, push-to-talk services, and so on.

In some examples, the SIM 114 (e.g., a SIM card that can be inserted into the user equipment 102, an eSIM (e.g., an embedded, electronic, and/or enhanced SIM), an iSIM (e.g., an integrated SIM), etc.) can be any type of electrical component or electrical circuit (e.g., an integrated circuit, a portable memory chip, or an integrated memory chip).

The SIM 114 can be used for performing operations and/or storing information (e.g., information (e.g., application data 118) associated with an application (e.g., an onboard application, such as an application stored in, and executable by, the SIM 114), information (e.g., an unstructured supplementary service data (USSD) database 120) associated with one or more USSD values, and/or information (e.g., wireless subscriber information) associated with the user equipment 102, a user of the user equipment 102, and/or a wireless subscriber account associated with the user). The SIM 114 can receive, store, update, and/or manage the wireless subscriber information (e.g., a mobile station international subscriber director number (MSISDN) 122 (e.g., a phone number of a user associated with the user equipment 102) and/or an internet protocol (IP) multimedia subsystem (IMS) public user identity (IMPU) 124). The SIM 114 can store the wireless subscriber information that received from the MNO for use by the user equipment 102.

The SIM 114 can be utilized to access services associated with the wireless subscriber account (also referred to herein as an "account"). The wireless subscriber account can be provided by the service provider. The SIM 114 can be activated based on one or more request messages (e.g., wireless subscriber information request message(s), also referred to herein as "wireless subscriber information request(s)) transmitted by the user equipment 102. That is, the SIM 114 can include a unique number (e.g., an integrated circuit card identifier (ICCID)) printed on the memory chip which requires activation by the service provider (e.g., via a website associated with the service provider, via a call to the service provider, via provisioning by the service provider, etc.).

In some examples, the user equipment 102 can transfer the wireless subscriber information request(s) based on one or more corresponding request messages (e.g., SIM information request message(s), also referred to herein as "SIM information request(s)") received from the SIM 114 for the wireless subscriber information. Individual ones of the SIM information request(s) (e.g., any SIM information request or each of more than one of the SIM information request(s)) can be associated with a configurable value (e.g., an unstructured supplementary service data (USSD)) code and transmitted by the SIM based on the SIM processing the USSD code. Any number of SIM information requests can be utilized for any number of corresponding USSD codes and corresponding subscription values.

In some instances, any configurable value or each of more than one of the configurable value(s) can be a USSD code, such as a plurality of characters that begin with a special character (e.g., a first special character (e.g., "*" or "#")), followed by one or more characters (e.g., three numbers), and that end with a special character (e.g., a second special character (e.g., "#"). In those instances, the plurality of characters can include a first character that is the first special character (e.g., "*"), second-fourth characters that are numbers, and a fifth character that is the second special character (e.g., "#"). However, the current disclosure is not limited as such, and any configurable value or each of more than one of the configurable value(s) can be a USSD code that includes any combination of one or more characters (e.g., any combination of one or more special characters and/or one or more other types of characters) usable by the mobile device to perform a USSD operation.

In some examples, the SIM information requests(s) can include a SIM information request associated with a configurable value (e.g., a first configurable value (e.g., a first USSD code)) utilized to request a subscription value (also referred to herein as a "subscriber" value) (e.g., a first subscription value (e.g., the MSISDN 122)) of the wireless subscriber information. Alternatively or additionally, the SIM information requests(s) can include a SIM information request associated with a configurable value (e.g., a second configurable value ((e.g., a second USSD code)) to request a subscription value (e.g., a second subscription value (e.g., the IMPU 124)) of the wireless subscriber information.

In some examples, the service provider can activate an account (e.g., an account of a user of the user equipment 102) and the SIM 114 based on the wireless subscriber information request(s) and the wireless subscriber information. Activation of the account can be based on the service provider determining and transmitting the wireless subscriber information. In some examples, activation of the account can be based on the service provider confirming receipt by the user equipment 102 of the wireless subscriber information. In those examples, confirming receipt can include receiving a message (e.g., a confirmation message transmitted by the user equipment 102) confirming the wireless subscriber information is received by the user equipment 102 and/or stored in the SIM 114. Following activation of the account and the SIM 114, various services offered by the service provider can be utilized via the user equipment 102. In some examples, for instance with the account being activated based on the service provider determining the SIM 114 is activated by confirming receipt according to one of the techniques discussed above, the various services (e.g., voice and/or video calls) can be offered by the service provider based on the account being activated.

In some examples, the SIM 114 can be activated further based on one or more corresponding response messages (e.g., wireless subscriber information response message(s), also referred to herein as wireless subscriber information response(s)) received by the user equipment 102, based on the wireless subscriber information request message(s). In those examples, activation of the SIM 114 can be further based on the user equipment 102 transmitting one or more corresponding SIM information response messages (e.g., SIM information response message(s), also referred to herein as SIM information response(s)) to the SIM 114. The user equipment 102 can transmit the SIM information response(s) to the SIM 114 based on the wireless subscriber information response(s). The SIM information response(s)

can include the wireless subscriber information received in the wireless subscriber information response(s).

In some examples, for instance with an eSIM, a profile (e.g., an eSIM profile) including a unique number (i.e., associated with a service provider) and other data (e.g., account data (e.g., an MSISDN (e.g., the MSISDN 122), an IMPU (e.g., the IMPU 124), a subscription key, an account number, and/or service plan profile(s), etc.), restriction(s), etc.) can be downloaded by the user equipment 102, and no further activation is required to activate an account associated with the service provider and/or otherwise use services available from the service provider. For instance, a local profile assistant (e.g., computer-readable instructions) associated with the user equipment 102 can download a profile (e.g., a virtual provide) from a service provider and install the profile on the user equipment 102. As a result, the SIM 114 of the user equipment 102, which can be an eSIM, can be associated with the MSISDN 122, the IMPU 124, and the downloaded profile provided by the service provider. General profile provisioning is defined in GSMA RSP (Remote SIM Provisioning) for consumer devices technical specification standard SGP.22, for example. XX In some examples, the SIM 114 can store SIM data 116. The SIM data 116 can include the MSISDN 122 and the IMPU 124. The SIM data 116 can include a profile associated with the user. The profile can indicate which service plans, services, functionalities, etc. are available for the user equipment 102 from a particular service provider. The SIM data 116 can include personal data of the user, such as, but not limited to, data associated with the MSISDN 122 and/or the IMPU 124, an address book of the user, text messages sent and received via the user equipment 102, and other data. In some examples, the SIM data 116 can include data associated with profile(s) that can be stored on the SIM 114 or can otherwise be accessible by the SIM 114. In some examples, the SIM data 116 can include service provider data (e.g., the current service provider associated with the SIM 114, etc.), brand data (e.g., current brand associated with the SIM 114, etc.), capability data (e.g., which radio access technology(s) the SIM 114 is configured to use, etc.), authentication data, and/or the like.

In some examples, the user equipment 102 can communicate with server(s) 126 associated with the service provider via one or more networks 128. In some examples, the network(s) 128 can include access network(s) (e.g., network(s) that connect users (e.g., user equipment associated therewith) to a service provider (e.g., a telecommunications service provider), provider network(s), a core network (which, in some examples can be a "carrier" network) (e.g., that connects one or more other service providers to one another), etc. In some examples, such network(s) 128 can comprise cellular networks, the Internet, and/or the like.

The server(s) 126 can include one or more components, such as processor(s) 130, network hardware 132, and computer-readable media 134. The processor(s) 130 can comprise the same or similar structure and/or function as the processor(s) 104 described above. The computer-readable media 134, can include computer storage media and/or communication media, both of which are described above with reference to the computer-readable media 110. That is, the computer-readable media 134 can have the same or similar structure and/or function as the computer-readable media 110 described above.

The network hardware 132 can provide wired or wireless networking capabilities to the server(s) 126. For example, the network hardware 132 can be utilized for any of the message(s) and/or information received by, and/or transmitted to, the server 126. The network hardware 132 can include or be incorporated into processors, ASICs, programmable circuits such as FPGAs, or in other ways.

The computer-readable media 134 can store management components 136, which can include an OTA management component 138 and a wireless subscriber information management component 140. The management components 136 can be utilized to implement any of the functions, as discussed below in FIGS. 2-4. The OTA management component 138 can be utilized to process the wireless subscriber information request(s) received from the user equipment 102, and/or the wireless subscriber information response(s) transmitted to the user equipment 102. The wireless subscriber information management component 140 can be utilized to process and/or to determine the wireless subscriber information (e.g., the MSISDN 122 and/or the IMPU 124). The management components 136 can include device data, which can include the device data 112, or a portion thereof.

The computer-readable media 134 can store a USSD database 142 and subscriber data 144. The USSD database 142 can include the USSD database 120. In some examples, some or all of data stored in the USSD database 142 can be the same as some or all of data stored the USSD database 120. Initialization and/or one or more updates to the data in the USSD database 142 can be the same as corresponding initialization and/or one or more corresponding updates to the data in the USSD database 120, and vice versa.

The subscriber data 144 can store wireless subscriber information (e.g., an MSISDN (e.g., the MSISDN 122) and/or an IMPU (e.g., the IMPU 124)) determined by the wireless subscriber information management component 140. Initialization and/or one or more updates to the data (e.g., the MSISDN and/or the IMPU) in the subscriber data 144 can be the same as corresponding initialization and/or one or more corresponding updates to the corresponding data (MSISDN 122 and/or the IMPU 124) in SIM data 116. Although the wireless subscriber information can include the MSISDN 122 and/or the IMPU 124 as discussed in the current disclosure, it is not limited as such. In some examples, the wireless subscriber information can include the MSISDN 122, the IMPU 124, and/or information of any type associated with the user and/or the wireless account of the user. In those examples, any techniques as discussed in the current disclosure can be implemented for the information of any type in a similar way as for the MSISDN 122 and/or the IMPU 124.

Any management component (e.g., one of the management components 136), or each of more than one of the management components 136 (e.g., the USSD management component 138, the wireless subscriber information management component 140, the USSD database 142, and/or the subscriber data 144), can be stored locally with the server(s) 126 (as illustrated) and/or be stored remotely and be accessible to the server(s) 126. The USSD database 142 can store the USSD database 120, or a portion thereof, and the subscriber data 144 can store the MSISDN 122 and the IMPU 124, or a portion thereof, as described above.

In some examples, the computer-readable media 134 can store, as part of, or separately from, the subscriber data 144, data associated with users (e.g., the user of the user equipment 102 and one or more other users), including but not limited to, data associated with user identities (e.g., identifies corresponding to account holders associated with user equipment), MSISDNs (e.g., phone numbers of the account holders), IMPUs associated with accounts of the users, address books of the account holders, contacts of the account holders, text messages sent and received via the user equipment, identity and/or service plan profiles (e.g., amount of data, voice calling, and/or text messaging available, whether data, voice calling, and/or text messaging is available internationally, data transmission speeds accessible, plan restrictions, etc.), etc. In some examples, an account can additionally or alternatively include a purchase history of the user account, a billing history associated with the user account, a subscription tier associated with the user account, services associated with the user account, a number of lines associated with the user account, or devices associated with the user account. In some examples, a user account can enable a user to utilize wireless telecommunications services of the service provider, as described above.

In some examples, the management components 136 can include a remote file management (RFM) protocol component (e.g., an RFM component). The RFM component can be utilized by MNO to transmit data (e.g., one or more files that include the application data 118, the transmitted "file(s)" also being referred to herein as "application data" (e.g., the application data 118), for simplicity) to the user equipment 102. The application data 118 can be transmitted (e.g., "pushed") to the user equipment 102, via the network(s) 128. The user equipment 102 can transmit the application data 118 to the SIM 114, which can store the application data 118. The SIM 114 can execute the corresponding application utilizing the application data 118 (e.g., the application data 118 having been received via the RFM protocol), to request and/or receive the wireless subscriber information.

In some examples, the management components 136 can include a remote application management (RAM) protocol component (e.g., a RAM component). The RAM component can be utilized by MNO to transmit data via the network(s) 128 and to the user equipment 102.

Any of the management components 136, individually or in combination with one or more other management components, can be in a form of a stand-alone application, productivity application, an operating system component, or any other application or software component configured to perform operations as described herein. The management components 136 can be stored together or in a distributed arrangement. In some examples, the management components 136 can be implemented as separate components. In other examples, one or more of the management components 136 and/or one or more other management components can be integrated together and/or implemented as a single component.

Computing resources provided by the management components 136, or by the system 100 that includes the management components 136, can be utilized to implement various services described herein. As discussed above, the system 100, of which the management components 136 are a part, can include the server(s) 126. Any number of the server(s) 126 can be utilized to provide the management components 136. In some examples, one or more of the server(s) 126 can provide any of the management components 136. Additionally or alternatively, one or more other servers in an external system (e.g., a separate system associated with the same service provider, or a separate system associated with a different service provider), which can communicate with the system 100, via the network(s) 128 and/or one or more other networks, can provide any of the management components 136.

Figure 2:
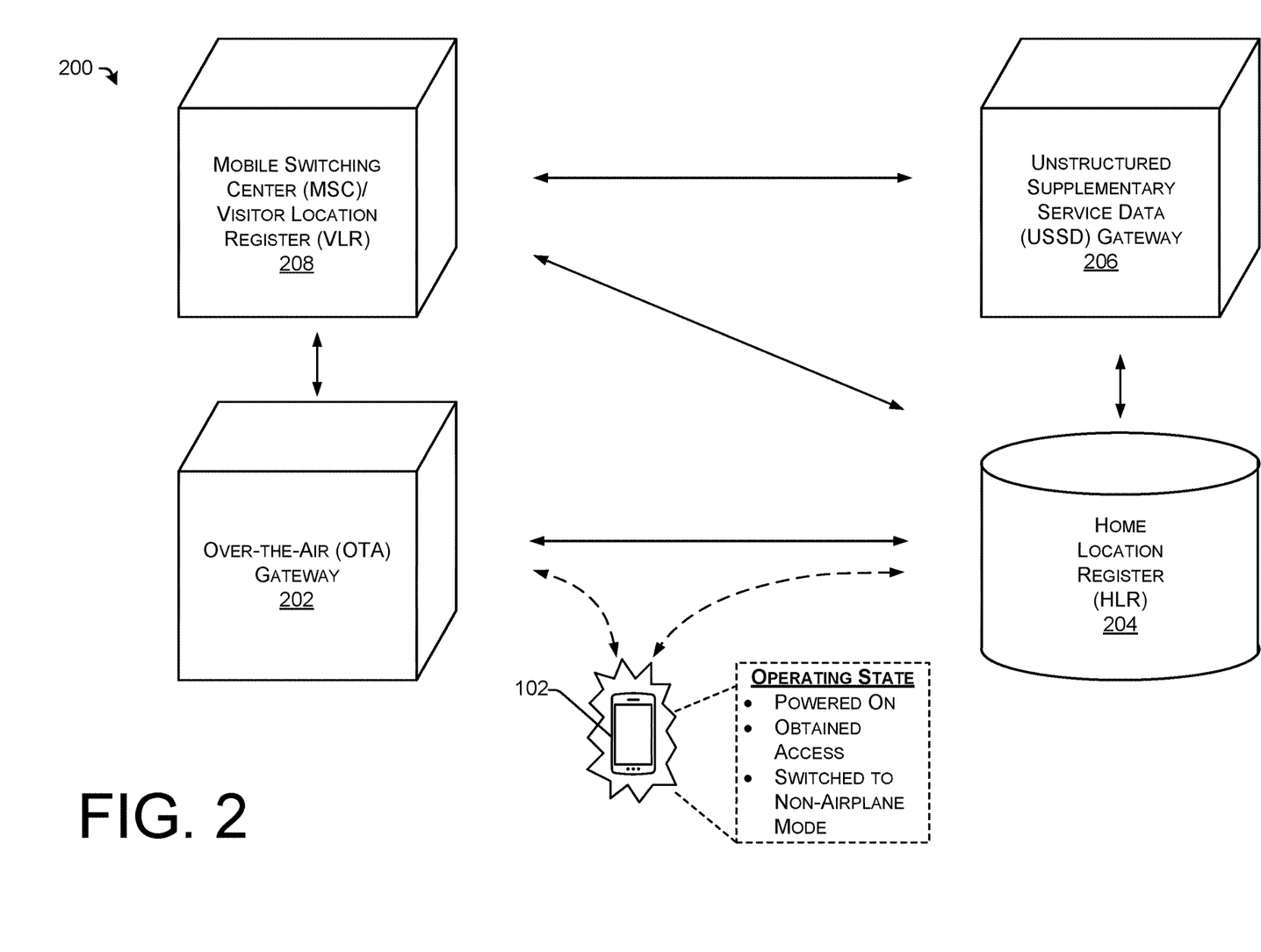
FIG. 2 is a block diagram of a system for automated activation of a SIM using an onboard application, as described herein.

FIG. 2 is a block diagram of a system 200 for automated activation of a SIM using an onboard application, as described herein. The system 200, which can be utilized to implement functions of a service provider, can include an over-the-air (OTA) gateway 202, a home location register (HLR) 204, an unstructured supplementary service data (USSD) gateway 206, and a mobile switching center (MSC)/visitor location register (VLR) 208. Any component (e.g., the OTA gateway 202, the HLR 204, the USSD gateway 206, or the MSC)/VLR 208), or each of more than one of the components (also referred to herein as "nodes"), of the system 200 can be implemented by one or more management components (e.g., one or more of the management components 136, as discussed above with reference to FIG. 1).

The OTA gateway 202 can transmit application data (e.g., the application data 118, as discussed above with reference to FIG. 1) to the user equipment 102. The application data 118 can be transmitted utilizing OTA technology, via a wireless network. The OTA gateway 202 can transmit the application data based on the user equipment 102 being connected to the wireless network. The user equipment 102 can receive the application data 118, which can be stored by the SIM 114.

In some examples, for instance with the application data 118 being transmitted to the user equipment 102, the OTA gateway 202 can transmit a message (e.g., a short message service (SMS) message) that includes the application data 118 to the user equipment 102. The user equipment 102 can receive, from the message, the application data 118, which can be transmitted to, and stored by, the SIM 114 (e.g., the application data 118 received by the user equipment 102 can be stored as part of the SIM data 116). In some examples, the OTA gateway 202 can transmit, via a short message service center (SMSC), the application data 118 to the user equipment 102.

In some examples, the application data 118 can be transmitted by the OTA gateway 202, based on the service provider (e.g., the OTA gateway 202) receiving a request (e.g., an application request) from the user equipment. The application request message can be transmitted by the user equipment 102 based on the user equipment 102 being connected to the wireless network, as discussed above.

The HLR 206 can receive one or more requests (e.g., the wireless subscriber information request(s), as discussed above with reference to FIG. 1), and transmit the corresponding response(s) with the wireless subscription information (e.g., the MSISDN 122 and/or the IMPU 124). The request(s) received by the HLR 206 can be transmitted by the user equipment 102. The HLR 206 can transmit one or more corresponding response(s) based on the request(s) received by the HLR 206.

In some examples, the wireless subscriber information request(s) that are received can be transmitted by the user equipment 102 based on the user equipment 102 and/or the SIM 114 determining the user equipment 102 is connected to the wireless network (e.g., the network(s) 128). The user equipment 102 being connected to the network(s) 128 can be determined by the user equipment 102 and/or the SIM 114 based on an operating state of the user equipment 102. For example, the operating state being associated with the user equipment 102 can be used to determine the user equipment 102 is connected to the network(s) 128. The user equipment 102 can determine a state of operation of the user equipment 102 is the operating state, based on the user equipment 102 changing from a non-operating state to the operating state. The operating state can be associated with the user equipment 102 having been powered on, the user equipment 102 having undergone a power cycle, the user equipment 102 having obtained access to the network(s) 128, and/or having been switched to a non-airplane mode. In some examples, the user equipment 102 having been powered on can be associated with the user equipment 102 being new and/or unused. In some examples, the user equipment 102 having obtained access to the network(s) 128 can be associated with the user equipment 102 being moved from an area (e.g., a first area) at which the user equipment 102 does not have access to the network(s) 128 (e.g., an area that is a dead zone or that has no signal), to an area (e.g., a second area) at which the user equipment 102 has access to the network(s) 128 (e.g., an area that has coverage or that has a signal). In some examples, the user equipment 102 having been switched to the non-airplane mode can be associated with a setting of the user equipment 102 being switched from an airplane mode to the non-airplane mode (e.g., a normal mode).

In some examples, the request(s) can be received by the HLR 206, and routed to the USSD gateway 206 and/or the MSC/VLR 204; and the corresponding response(s) can be received by the HLR 206, and routed to the USSD gateway 206 and/or the MSC/VLR 204. In those examples, the HLR 206 can forward/transmit the received request(s) to the USSD gateway 206 and/or the MSC/VLR 204. In those examples, the USSD gateway 206 and/or the MSC/VLR 204 that receives the request(s) can process the request(s), in a similar way as discussed above for the HLR 204, and transmit corresponding response(s) to the HLR 206. The HLR 206 can forward/transmit the received response(s) to the user equipment 102. In some examples, any of the components (e.g., the OTA gateway 202, the HLR 204, the USSD gateway 206, and the MSC/VLR 208) can perform any corresponding functions as discussed above in this disclosure, based on communications exchanged with one or more other components.

Figure 3:
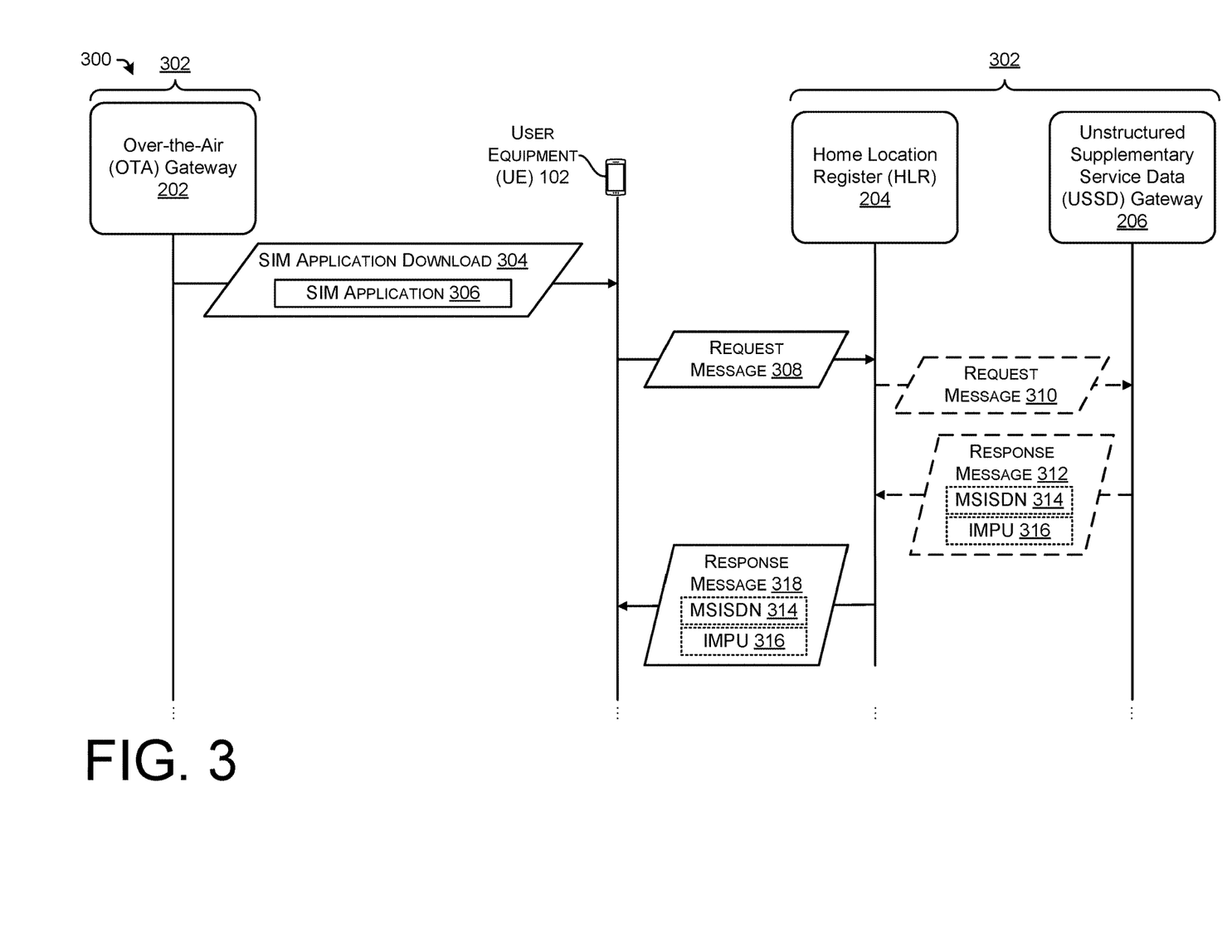
FIG. 3 is a diagram illustrating example signaling between a user equipment (UE) and example nodes, as well as a technique for automated activation of a SIM using an onboard application, as described herein.

FIG. 3 is a diagram illustrating example signaling 300 between a user equipment (UE) and example nodes, as well as a technique for automated activation of a SIM using an onboard application, as described herein. It is to be appreciated that the "nodes" 302 depicted in FIG. 3 may in fact represent multiple nodes or a single node. It is also to be appreciated that additional nodes may be utilized in the activation of a SIM even though they are not depicted in FIG. 3. For example, and without limitation, a mobile switching center (MSC), a visitor location register (VLR), an MSC/VLR (e.g., the MSC/VLR 208, as discussed above with reference to FIG. 2), and the like may be involved in the activation of a SIM, as would be recognized by a person having ordinary skill in the art.

Activation of the SIM can involve exchanging, by the user equipment 102, communications with the OTA gateway 202, the HLR 204, and the USSD Gateway 206, as discussed above with reference to FIG. 2. The communications can include a SIM application download 304 from the OTA gateway 202. The SIM application download 304 can include transmitting, by the OTA gateway 202 and to the user equipment 102, a SIM application 306. The SIM application 306 can be implemented as the application (e.g., the application data 118), as discussed above with reference to FIG. 1.

The OTA gateway 202 and the user equipment 102 and can perform the SIM application download 304 of the SIM application 306 to the user equipment 102, based on the user equipment 102 being connected to the wireless network (e.g., the network(s) 128). In some examples, the OTA gateway 202 can transmit the SIM application 306 to the user equipment 102 based the OTA gateway 202 determining a connection between the user equipment 102 and the network(s) 128 has been established. In those examples, for instance when the user equipment 102 is connected with the network(s) 128, the user equipment 102 can transmit a message (e.g., an application request message) based on the user equipment 102 being connected to the network(s) 128. The OTA gateway 202 determining the user equipment 102 is connected to the network(s) 128 can include determining the application request message is received from the user equipment 102.

The OTA gateway 202 can transmit (e.g., "push") the SIM application data to the user equipment 102 using OTA technology. In some examples, the OTA gateway 202 can transmit a message (e.g., a short message service (SMS) message) that includes the SIM application 306 to the user equipment 102. Although the message including the SIM application 306 can be an SMS message as discussed above in this disclosure, it is not limited as such. In some examples, the message including the SIM application 306 can be any type of message associated with OTA technology (e.g., an OTA platform) or another type of technology.

Although transmitting the SIM application 306 to the user equipment 102 can be based on the request message received from the user equipment 102 as discussed above in this disclosure, it is not limited as such. In some examples, the OTA gateway 202 transmits the SIM application 306 without requiring that any messages are received from the user equipment 102. In those examples, the OTA gateway 202 can transmit one or more of a plurality of application data to any number of one or more user equipments. The plurality of application data can include the SIM application 306 being transmitted to any number of one or more user equipments (e.g., the user equipment 102). The plurality of application data can be transmitted based on the MNO determining an initial version of the SIM application 306 is available to be transmitted. The plurality of application data can be transmitted based on the MNO determining an updated version of the SIM application 306 is available to be transmitted. The plurality of application data can be transmitted at a time determined by the MNO. The time can be based on an amount passing since application data (e.g., the same application data or different application data) was previously transmitted meeting or exceeding a threshold amount of time.

Although the SIM application 306 can be downloaded to the user equipment 102 as discussed above in this disclosure, it is not limited as such. In some examples, the SIM application 306 can be transmitted and/or installed on the SIM 114 prior to the SIM 114 being utilized by (e.g., inserted into) the user equipment 102, in a case in which the SIM 114 is a SIM card. In some examples, the SIM application 306 can be transmitted and/or installed on the SIM 114 via a direct and or a wired connection. In those examples, the SIM application 306 can be transmitted and/or installed on the SIM 114, prior to the user equipment 102 being acquired by the user and/or prior to activation of the account of the user and/or the SIM 114.

The user equipment 102 can transmit, to the HLR 204, one or more request messages (e.g., the wireless subscriber information request message(s), as discussed above with reference to FIG. 1). In those examples, the request messages can include a request message 308, which is transmitted by the user equipment 102 and to the HLR 204. The request message 308 can be transmitted by the user equipment 102, based on the user equipment 102 running a USSD code, as discussed above with reference to FIG. 1. The request message 308 can be any type of message (e.g., a USSD message, a short message service (SMS) message, etc.). The user equipment 102 can run the USSD code based on a SIM information request received from the SIM application 306. In some examples, the SIM information request can include the USSD code, based on the SIM application 306 having determined the USSD code. In those examples, the SIM application 306 can determine the USSD code, and transmit the SIM information request with the USSD code. The SIM application 306 determining the USSD code and transmitting the SIM information request can be based on the operating state of the user equipment 102, as discussed above with reference to FIG. 2.

In some examples, the request message 308 can include information for determining a subscription value. In those examples, the information can include a type of wireless subscriber information (e.g., a subscription value type), or an indication (e.g., the USSD code, or an indication generated by the user equipment 102 based on the USSD code) associated with the wireless subscriber information type.

In some examples, the HLR 204 can transmit a request message 310 to the USSD gateway 206. The request message 310 can include the information in the request message 308 for determining the subscription value. The USSD gateway 206 can determine the subscription value (e.g., the MSISDN or the IMPU) associated with the user of the user equipment 102 and/or the account of the user. The subscription value associated with the user and/or the account can be determined based on the request message 310. The subscription value associated with the user and/or the account can be the MSISDN, based on the subscription value type indicated via the request message 310 being an MSISDN type. The subscription value associated with the user and/or the account can be the IMPU, based on the subscription value type indicated via the request message 310 being an IMPU type.

The USSD gateway 206 can transmit a response message 312 to the HLR 204, based on the subscription value type indicated in the request message being associated with an MSISDN or an IMPU. The response message 312 can include an MSISDN 314 associated with the user of the user equipment 102 and/or the account of the user, based on the subscription value type indicated in the request message being associated with an MSISDN. Alternatively, the response message 312 response can include an IMPU 316 associated with the user of the user equipment 102 and/or the account of the user, based on the subscription value type indicated in the request message being associated with an IMPU.

The HLR 204 can transmit, to the user equipment 102, a response message 318 associated with the subscription value type indicated in the response message 312 being associated with an MSISDN or an IMPU. The response message 318 can include the MSISDN 314 associated with the user of the user equipment 102 and/or the account of the user, based on the subscription value type indicated in the request message being associated with an MSISDN. Alternatively, the response message 312 response can include the IMPU 316 associated with the user of the user equipment 102 and/or the account of the user, based on the subscription value type indicated in the request message being associated with an IMPU.

In some examples, transmissions of the request message 308, the request message 310, the response message 312, and the response message 318 can be performed for the MSISDN 314, followed by transmissions of the request message 308, the request message 310, the response message 312, and the response message 318 being performed for the IMPU 316. Alternatively, transmissions of the request message 308, the request message 310, the response message 312, and the response message 318 can be performed for the IMPU 316, followed by transmissions of the request message 308, the request message 310, the response message 312, and the response message 318 being performed for the MSISDN 314. Alternatively, transmissions of each of the request message 308, the request message 310, the response message 312, and the response message 318 can be performed for both the MSISDN 314 and the IMPU 316.

In some examples, the response message 318 according to any of the techniques above discussed in the current disclosure can be determined and transmitted by the HLR 204, based on the request message 308. In those examples, the HLR 204 can, without transmitting any request message to, or receiving any response message from, the USSD gateway 206, determine the subscription value and the response message 318, and transmit the response message 318.

Although the MSISDN 314 or the IMPU 316 is included in each of the response message 312 and the response message 318 as discussed above in this disclosure, it is not limited as such. Any number of subscription values (e.g., one or both of the MSISDN 314, the IMPU 316, and any other subscription values of any type) can be included in one or more of the response message 312 and the response message 318.

Figure 4:
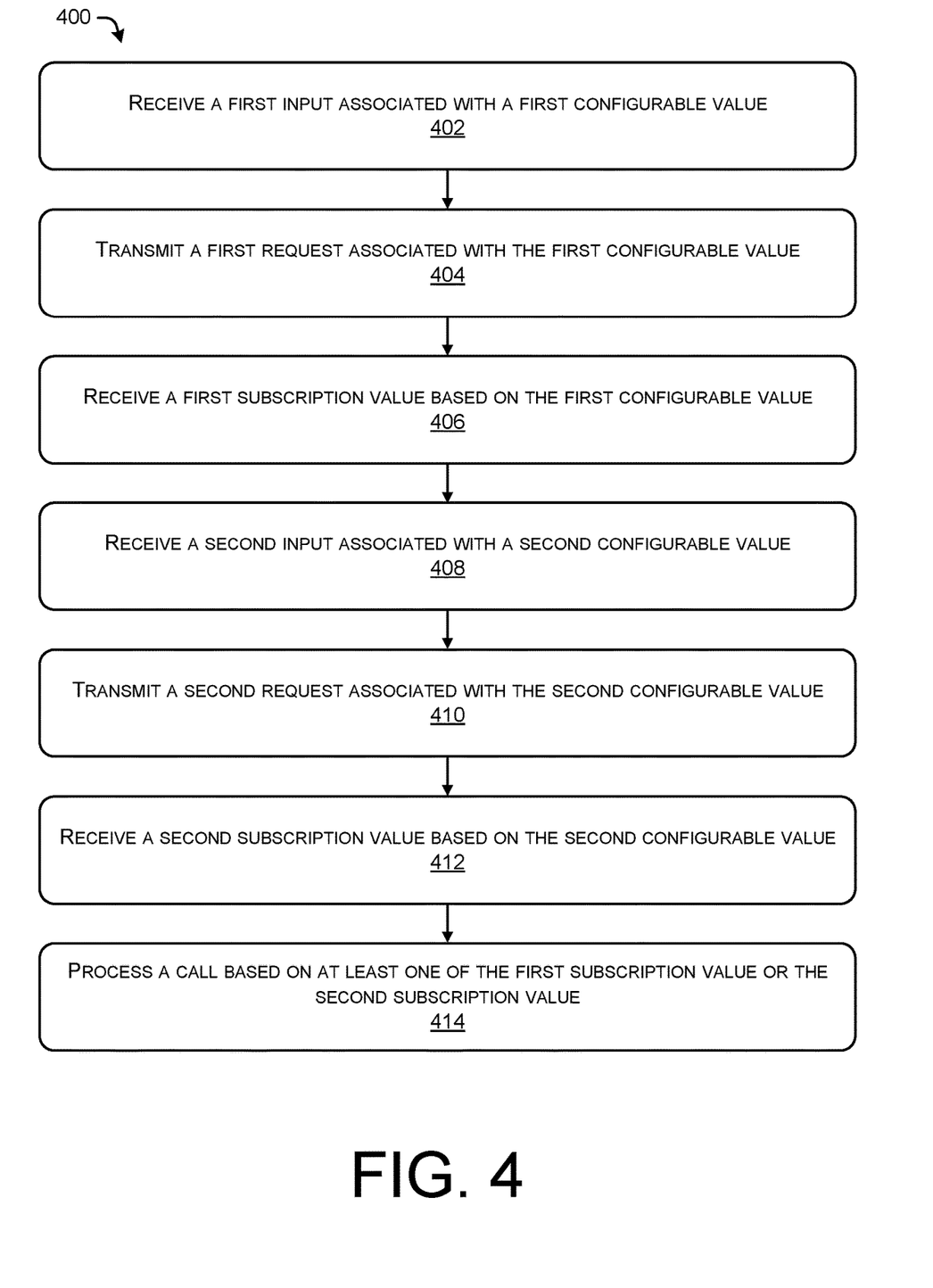
FIG. 4 illustrates a flow diagram of an example process 400 for automated activation of a SIM using an onboard application, as described herein.

FIG. 4 illustrates a flow diagram of an example process 400 for automated activation of a SIM using an onboard application, as described herein.

The example process 400 can be performed by a mobile device (e.g., user equipment 102) or another component, in connection with other components discussed herein.

At operation 402, the process can include receiving a first input (e.g., a first SIM information request) associated with a first configurable value (e.g., a first USSD code). The first input can be received from a SIM (e.g., the SIM 114). The first USSD code can be received by the user equipment 102 and from the SIM 114, based on the SIM 114 determining the first USSD code in the USSD database 120. The SIM 114 can determine the first USSD code, based on determining a type of subscription value to be included in the first SIM information request. The first USSD code in the USSC database 120 can be determined as associated with the subscription value type (e.g., a MSISDN type).

In some examples, the SIM 114 can determine any of the subscription value types for transmitting the corresponding SIM information request based on an order of entries (e.g., subscription value entries) in the USSD database 120. In some examples, a first entry of a plurality of entries in the USSD database 120 can be associated with the MSISDN type, according to which the SIM 114 can determine to include the first USSD code included in the first SIM information request. A counter value in the SIM data 116 can be utilized to indicate an entry of the USSD database 120 to be used for transmitting the corresponding SIM information request. The counter value can be updated (e.g., incremented) based on transmission of any of the SIM information requests, reception of any of the subscription values, and/or storage, in the corresponding entry of the USSD database 120, of any of the subscription values. In some examples, the counter value can have a value (e.g., a first value), to indicate the first SIM information request is associated with the first USSD subscription value type.

The first wireless subscriber information request can be transmitted based on application data (e.g., the application data 118) stored in the SIM 114. The first wireless subscriber information request can be transmitted based on the application data 118 being executed by the SIM 114.

At operation 404, the process can include transmitting a first request (e.g., a first wireless subscriber information request) associated with the first configurable value. The first wireless subscriber information request can be transmitted to the home location register (HLR) 204.

At operation 406, the process can include receiving a first subscription value (e.g., a MSISDN) of a first subscription value type (e.g., the MSISDN type) based on the first configurable value. The first subscription value can stored by the SIM 114. The first subscription value being stored by the SIM 114 can be based on whether the first subscription value received by the SIM 114 is different from the first subscription value previously received and stored by the SIM 114.

The SIM 114 can store the first subscription value received by the SIM 114 based on the first subscription value received by the SIM 114 being different from the first subscription value previously received and stored by the SIM 114. In some examples, for instance with the first subscription value received by the SIM 114 being different from the first subscription value previously received, the first subscription value received by the SIM 114 can replace the first subscription value previously received and stored by the SIM 114. The SIM 114 can refrain from storing the first subscription value received by the SIM 114 based on the first subscription value received by the SIM 114 matching the first subscription value previously received and stored by the SIM 114.

At operation 408, the process can include receiving a second input (e.g., a second SIM information request) associated with a second configurable value (e.g., a second USSD code). The second input can be received in a similar way as the first input. In some examples, a second entry of a plurality of entries in the USSD database 120 can be associated with the IMPU type, according to which the SIM 114 can determine to include the second USSD code included in the second SIM information request.

The second USSD code in the USSC database 120 can be determined as being associated with the second subscription value type (e.g., an IMPU type). The counter value, having been incremented based on transmission of the first SIM information request, can have a value (e.g., a second value) to indicate the second SIM information request is associated with the second USSD subscription value type. The second wireless subscriber information request can be transmitted based on execution by the SIM 114 of the application data 118.

Although the counter value is utilized along with entries of the USSD database 120 as discussed above in the current disclosure, it is not limited as such. The counter value can be used without being associated with entries of the USSD database 120 in a similar way as for counter value being associated with the entries, except with the counter value being incremented based on transmission of each of the SIM information requests, reception of any of the subscription values, and/or storage of any of the subscription values. The counter value in any of the techniques discussed herein can be reset after completion of one or more processing of SIM information requests to store one or more of the subscription values (e.g., after subscription value of all types are received, and processed and/or stored). The counter value can be reset after completion of network registration process.

Although the entries in the USSD database 120 can be utilized by the SIM 114 to determine to include the first USSD code in the first SIM information request and the second USSD code in the second SIM information request, as discussed above in the current disclosure, it is not limited as such. Any other technique can be utilized to determine an order in which USSD codes are included in SIM information requests. In some examples, the SIM 114 can determine the type of subscription value to be included in the corresponding SIM information request based on information received from the MNO. The MNO can transmit, to the user equipment 102, information indicating one or more types of subscription values awaiting transmission, which can be transmitted to the SIM 114 and used to determine the type of subscription value to be included in each of the corresponding SIM information requests.

At operation 410, the process can include transmitting a second request (e.g., a second wireless subscriber information request) associated with the second configurable value. The second wireless subscriber information request can be transmitted to the HLR 204.

In some examples, the SIM 114 can determine to transmit one or more activation requests (e.g., one or more of the first SIM information request, the second SIM information request, and any number of other SIM information requests for other values), based on the operating state of the user equipment 102, as discussed above with reference to FIG. 2. In those examples, the one or more of the first SIM information request, the second SIM information request, and any number of other SIM information requests for other values can be transmitted by the SIM 114, further based on the mobile device changing to the operating state after an amount of time has exceeded a threshold amount of time, the amount of time being a difference between a current time and a previous time, the previous time being associated with a service provider receiving a previous activation request associated with the SIM 114.

In some examples, each network registration process (e.g., an initial registration process and/or an update registration process) performed by the user equipment 102 can include the USSD code associated with the MSISDN type being included in the first SIM information request, and the USSD code associated with the IMPU type being included in the second SIM information request, as discussed below. In other examples, each network registration process (e.g., an initial registration process and/or an update registration process) performed by the user equipment 102 can include the USSD code associated with the IMPU type being included in the first SIM information request, and the USSD code associated with the MSISDN type being included in the second SIM information request.

In other examples, the application data 118 can be utilized by the SIM 114 to include the USSD code associated with the MSISDN type or the IMPU type in the first SIM information request, based on a priority value of the MSISDN type and a priority value of the IMPU type. The USSD code associated with the MSISDN type can be included in the first SIM information request based on the priority value of the MSISDN type being higher than the priority value of the IMPU type. Alternatively, The USSD code associated with the IMPU type can be included in the first SIM information request based on the priority value of the IMPU type being higher than the priority value of the MSISDN type. In those examples, the second SIM information request can include the USSD code associated with the subscription value type that is different from the subscription value type with which the USSD code in the first SIM information request is associated. Each of the priority values of the corresponding subscription value types can be associated with corresponding lengths of time since the corresponding subscription values were previously updated, and/or previously received by the user equipment 102. In some examples, some or all of the priority values can be determined (e.g., set) by one or more of the MNO, the user equipment 102, and the SIM 114.

Any priority values transmitted to the UE 102 can be set, by the MNO, to be below a threshold priority value to request the SIM 114 to refrain from transmitting the SIM information request for the corresponding subscription value. The priority value can be set to be below the threshold priority value based on the corresponding length of time being less than a threshold length of time (e.g., one week, one month, one year, etc.). Any priority values transmitted to the UE 102 can be set, by the MNO, to meet or exceed a threshold priority value (e.g., the same or a different threshold priority value) to request the SIM 114 to transmit the SIM information request for the corresponding subscription value. The priority value can be set to meet or exceed the threshold priority value based on the corresponding length of time meeting or exceeding a threshold length of time (e.g., the same or a different threshold length of time) (e.g., the SIM 114 can be controlled to transmit the SIM information request for the corresponding subscription value after a certain amount of time has passed from a previous update of the corresponding subscription value).

In other examples, the application data 118 can be utilized by the SIM 114 to include the USSD code associated with the MSISDN type or the IMPU type in the first SIM information request, based on an update value of the corresponding subscription value. The update value can be determined by the MNO and transmitted in an update notification based on a change in the MSISDN or the IMPU associated with the user and/or the account of the user. The MNO can transmit, to the user equipment 102, an update notification associated with a change in the MSISDN and/or an update notification associated with a change in the IMPU. The SIM 114 can store each of the update values received by the MNO, via the user equipment 102. The user equipment 102 can route the update notification to the SIM 114, which can update the corresponding update value. The SIM 114 can transmit any of the SIM information requests associated with corresponding subscription values based on the corresponding update values.

In some examples, the update values can be used along with any of the techniques discussed above for transmitting the subscription values (e.g., one or more of using the information indicating one or more types of subscription values awaiting transmission by the MNO, using the counter values, etc.), such as the update values being utilized along with the counter values (e.g., the SIM 114 can transmit, or refrain from transmitting, a first SIM information request for the MSISDN based on a first counter value and a first update value), etc.

At operation 412, the process can include receiving a second subscription value (e.g., an IMPU) of a second subscription value type (e.g., the IMPU type) based on the second configurable value. The second subscription value can be stored by the SIM 114 in a similar way as for the first subscription value (e.g., the second subscription value can be stored based on whether the second subscription value received by the SIM 114 is different from the second subscription value previously received and stored by the SIM 114).

In some examples, for instance with the second subscription value received by the SIM 114 being different from the second subscription value previously received, the second subscription value received by the SIM 114 can replace the second subscription value previously received and stored by the SIM 114. Although techniques for receiving two subscription values (e.g., the first subscription value and the second subscription value) can be performed by the user equipment 102 as discussed above in the current disclosure, any number of subscription values (e.g., any type(s) of value(s) (e.g., the same type of subscription value (e.g., another IMPU), another type of subscription value, etc.) can be received by similar techniques as discussed above for the first subscription value and the second subscription value. By way of example, a third subscription value (e.g., another IMPU or a different type of subscription value) can be received after the second subscription value is received, by receiving a third input from the SIM 114, transmitting a third request, and receiving the third subscription value.

At operation 414, the process can include processing a call based on at least one of the first subscription value or the second subscription value. The call being processed can include a call received from another user equipment, with the user of the user equipment 102 communicating with another user of the other user equipment by voice and/or video. In some examples, the user equipment 102 can perform the call with the other user equipment, with the user of the user equipment 102 communicating by voice and/or video. Although the call is processed as discussed above in the current disclosure, any other functions (e.g., data communications, etc.) of the user equipment 102 associated with and/or utilizing the first subscription value, the second subscription value, and/or any type(s) of value(s) (e.g., the same type of subscription value (e.g., another IPU), another type of subscription value, etc.), can be performed by the user equipment 102 in a similar way as for the call.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:
1. A method comprising:
receiving, by a mobile device from a subscriber identification module (SIM) card in the mobile device, a first input associated with a first unstructured supplementary service data (USSD) value mapped by application data to a first subscription value type, the first input being determined by an application in the SIM card based at least in part on the application data associated with the application, the application data being stored in the SIM card;
transmitting, by the mobile device, a first request associated with the first USSD value based on the first input;
receiving, by the mobile device and based at least in part on the first USSD value, a mobile station international subscriber directory number (MSISDN) value of the first subscription value type to be stored by the SIM card;
receiving, by the mobile device from the SIM card, a second input associated with a second USSD value mapped by the application data to a second subscription value type, the second input being determined by the application in the SIM card based at least in part on the application data;

transmitting, by the mobile device, a second request associated with the second USSD value based on the second input;

receiving, by the mobile device and based at least in part on the second USSD value, an internet protocol (IP) multimedia subsystem (IMS) public user identity (IMPU) value of the second subscription value type to be stored by the SIM card; and processing, by the mobile device, a call based on at least one of the MSISDN value or the IMPU value, wherein the SIM card has a USSD database that includes the application data which maps USSD values to subscription value types.

2. The method of claim 1, wherein:
the MSISDN value is stored by the SIM card based at least in part on the MSISDN value not matching another MSISDN value of the first subscription value type stored on the SIM card; and
the MSISDN value replaces the other MSISDN value.

3. The method of claim 1, wherein the MSISDN value is not stored by the SIM card based at least in part on the MSISDN value matching another MSISDN value of the first subscription value type stored on the SIM card.

4. The method of claim 1, further comprising:
receiving an over-the-air (OTA) message, the OTA message including the MSISDN value.

5. The method of claim 1, wherein transmitting the first request further comprises:
determining the mobile device changes from a non-operating state to an operating state; and
transmitting the first request based at least in part on the mobile device being in the operating state.

6. The method of claim 1, wherein transmitting the first request further comprises:
determining the mobile device is in an operating state based at least in part on at least one of the mobile device being turned on, the mobile device obtaining access to a cellular service, or a mode of the mobile device being changed from an airplane mode to a non-airplane mode, the mobile device changing to the operating state after an amount of time has exceeded a threshold amount of time, the amount of time being a difference between a current time and a previous time, the previous time being associated with a service provider receiving an activation request associated with the SIM card; and
transmitting the first request based at least in part on the mobile device being in the operating state.

7. The method of claim 1, wherein:
receiving the MSISDN value further comprises receiving a first short message service (SMS) message including the MSISDN value; and
receiving the IMPU value further comprises receiving a second SMS message including the IMPU value.

8. The method of claim 1, wherein receiving the MSISDN value further comprises receiving, from a USSD gateway utilizing a hypertext transfer protocol (HTTP) interface, a USSD message including the MSISDN value.

9. The method of claim 1, wherein the application selects subscription type values for inputs received by the mobile device based on an order in which the USSD values mapped to them appear in the USSD database.

10. A mobile device, comprising:
a subscriber identification module (SIM) card configured with an application that transmits an input associated with an unstructured supplementary service data (USSD) value, wherein the USSD value is mapped by a USSD database stored on the SIM card to a subscription value type;
an interface configured to receive the input from the SIM card associated with the USSD value;
a transceiver configured to:
transmit a request associated with the USSD value based at least in part on the input;
receive an internet protocol (IP) multimedia core network subsystem (IMS) public user (IMPU) value of the subscription value type, based at least in part on the USSD value, to store on the SIM card; and
a processor configured to process a call based on the IMPU value,
wherein the IMPU value is a first IMPU value of the subscription value type stored by the SIM card based at least in part on the first IMPU value not matching a second IMPU value of the subscription value type stored on the SIM card, the first IMPU value replaces the second IMPU value.

11. The mobile device of claim 10, wherein the USSD database maps a second USSD value to another subscription value type, and the other subscription value type corresponds to mobile station international subscriber directory number (MSISDN) value.

12. The mobile device of claim 10, wherein the transceiver is further configured to receive, from an over-the-air (OTA) gateway, a short message service (SMS) message including the IMPU value based at least in part on the USSD value.

13. The mobile device of claim 10, wherein the transceiver is further configured to receive an over-the-air (OTA) message, the OTA message including the IMPU value.

14. The mobile device of claim 10, wherein transmitting the request further comprises:
determining the mobile device changes from a non-operating state to an operating state; and
transmitting the request based at least in part on the mobile device being in the operating state.

15. The mobile device of claim 10, wherein transmitting the request further comprises:
determining the mobile device is in an operating state based at least in part on at least one of the mobile device being turned on, the mobile device obtaining access to a cellular service, or a mode of the mobile device being changed from an airplane mode to a non-airplane mode, the mobile device changing to the operating state after an amount of time has exceeded a threshold amount of time, the amount of time being a difference between a current time and a previous time, the previous time being associated with a service provider receiving an activation request associated with the SIM card; and
transmitting the request based at least in part on the mobile device being in the operating state.

16. A method comprising:
receiving, by a network node and from a mobile device, a request based at least in part on an unstructured supplementary service data (USSD) value, the USSD value being mapped by a USSD database stored on a subscriber identification module (SIM) card in the mobile device to a subscription value type, wherein the USSD value is provided by an application executed by the SIM card to the mobile device; and transmitting, by the network node and to the mobile device, an internet protocol (IP) multimedia core network subsystem (IMS) public user (IMPU) value of the subscription value type based at least in part on the USSD value, to be stored by the SIM card and utilizable by the mobile device to process a call, wherein the USSD database maps a second USSD value to another subscription value type, and the other subscription value type corresponds to a mobile station international subscriber directory number (MSISDN) value.

17. The method of claim 16, wherein transmitting the IMPU value further comprises:
transmitting a short message service (SMS) message including the IMPU value based at least in part on the USSD value.

18. The method of claim 16, wherein:
the MSISDN value is stored by the SIM card based at least in part on the MSISDN value not matching another MSISDN value of the other subscription value type stored on the SIM card; and
the MSISDN value replaces the other MSISDN value.

19. The method of claim 16, wherein the MSISDN value is not stored by the SIM card based at least in part on the MSISDN value matching another MSISDN value of the other subscription value type stored on the SIM card.

20. The method of claim 16, further comprising:
receiving an over-the-air (OTA) message, the OTA message including the MSISDN value.

* * * * *